(12) United States Patent
Aikyo et al.

(10) Patent No.: US 11,155,316 B2
(45) Date of Patent: Oct. 26, 2021

(54) SADDLE-TYPE VEHICLE

(71) Applicant: HONDA MOTOR CO., LTD., Tokyo (JP)

(72) Inventors: Yutaka Aikyo, Wako (JP); Masanori Nakamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 442 days.

(21) Appl. No.: 16/316,659

(22) PCT Filed: Aug. 31, 2016

(86) PCT No.: PCT/JP2016/075561
§ 371 (c)(1),
(2) Date: Jan. 10, 2019

(87) PCT Pub. No.: WO2018/042575
PCT Pub. Date: Mar. 8, 2018

(65) Prior Publication Data
US 2021/0284268 A1    Sep. 16, 2021

(51) Int. Cl.
*B62J 45/414*    (2020.01)
*B62J 45/42*    (2020.01)
(Continued)

(52) U.S. Cl.
CPC ............ *B62J 45/414* (2020.02); *B62J 45/42* (2020.02); *B60R 21/0133* (2014.12); *B60R 2021/01006* (2013.01); *B62J 27/20* (2020.02)

(58) Field of Classification Search
CPC .......... B62J 45/414; B62J 45/42; B62J 27/20; B60R 21/0133; B60R 2021/01006
See application file for complete search history.

(56) References Cited

U.S. PATENT DOCUMENTS

2007/0051551 A1    3/2007   Kobayashi et al.
2008/0238056 A1    10/2008  Kobayashi et al.
(Continued)

FOREIGN PATENT DOCUMENTS

CN    105492258    4/2016
EP    2305520      4/2011
(Continued)

OTHER PUBLICATIONS

Chinese Office Action and Search Report for Chinese Patent Application No. 201680088267.8 dated Jan. 2, 2020.
(Continued)

*Primary Examiner* — Michael J Zanelli
(74) *Attorney, Agent, or Firm* — Amin, Turocy & Watson, LLP

(57) ABSTRACT

This saddle-type vehicle includes an occupant protection device (21), a plurality of acceleration sensors (S1 and S2) which detect translational acceleration in a forward and backward direction acting on a vehicle, and a control device (25) which controls an operation of the occupant protection device (21) on the basis of detection values of the acceleration sensors (S1 and S2). The plurality of acceleration sensors (S1 and S2) include a first acceleration sensor (S1) and a second acceleration sensor (S2). The first acceleration sensor (S1) is disposed above a center of gravity (G) of the vehicle. The second acceleration sensor (S2) is disposed below the center of gravity (G). The control device (25) averages a detection value (de1) detected by the first acceleration sensor (S1) and a detection value (de2) detected by the second acceleration sensor (S2) and controls an operation of the occupant protection device (21) on the basis of the averaged value.

7 Claims, 7 Drawing Sheets

(51) Int. Cl.
   *B60R 21/0132* (2006.01)
   *B60R 21/01* (2006.01)
   *B62J 27/20* (2020.01)

(56) References Cited

U.S. PATENT DOCUMENTS

| | | | |
|---|---|---|---|
| 2011/0074139 A1* | 3/2011 | Kobayashi | B62J 27/00 280/730.1 |
| 2013/0317702 A1* | 11/2013 | Kobayashi | B60R 21/0132 701/46 |
| 2014/0070931 A1* | 3/2014 | Savaresi | B60R 21/01336 340/436 |
| 2014/0125450 A1 | 5/2014 | Brandolese et al. | |

FOREIGN PATENT DOCUMENTS

| | | |
|---|---|---|
| JP | 2007-69699 | 3/2007 |
| JP | 2008-247319 | 10/2008 |
| JP | 2011-020498 | 2/2011 |
| JP | 2011-073633 | 4/2011 |
| JP | 2011-230651 | 11/2011 |
| JP | 2012-153348 | 8/2012 |
| JP | 2013-542127 | 11/2013 |
| WO | 02/49883 | 6/2002 |
| WO | 2012/056424 | 5/2012 |

OTHER PUBLICATIONS

Extended European Search Report for European Patent Application No. 16915136.2 dated Jul. 15, 2019.
International Search Report and Written Opinion for International Application No. PCT/JP2016/075561 dated Nov. 1, 2016, 10 pgs.
Japanese Notice of Allowance for Japanese Patent Application No. 2018-536600 dated Nov. 26, 2019.

* cited by examiner

SADDLE-TYPE VEHICLE

FIELD OF THE INVENTION

The present invention relates to a saddle-type vehicle with an occupant protection device.

BACKGROUND ART

As a saddle-type vehicle such as a motorcycle, a saddle-type vehicle equipped with an airbag device is known (refer to, for example, Patent Document 1).

In the saddle-type vehicle described in Patent Document 1, a plurality of acceleration sensors for detecting acceleration acting in forward and backward directions of a vehicle body are mounted on the left and right body frames on the rear side of the engine unit, and a control device operates the airbag device on the basis of detection signals of the acceleration sensors.

In this saddle-type vehicle, since the plurality of acceleration sensors are provided in bilateral symmetry with respect to the vehicle body, it is possible to accurately detect an impact in the forward and backward directions of the vehicle body.

However, in the above-described saddle-type vehicle, for example, when a front wheel collides with another object during travel, translational acceleration (negative translational acceleration) in a traveling direction of the vehicle occurs in an initial stage of the collision, and when the collision progresses and a front wheel suspension sinks to the vicinity of a limit position, large pitching around the center of gravity of the vehicle occurs in the vehicle body. Then, when the pitching around the center of gravity acts on the vehicle body, tangential acceleration acts on a position away from the center of gravity.

In the above-described saddle-type vehicle, it is necessary to prevent the tangential acceleration due to the pitching of the vehicle from affecting a detection result of the acceleration sensor. To this end, the above-described saddle-type vehicle is devised with the acceleration sensor mounted at the same height as a position of the center of gravity of the vehicle so that a component in forward and backward directions of a vehicle body in the tangential acceleration due to the pitching does not affect the acceleration detection in the forward and backward directions of the vehicle body due to the acceleration sensor.

However, when the acceleration sensor is mounted at the same height as the position of the center of gravity of the vehicle, the acceleration sensor greatly limits a layout of the other parts, and the degree of freedom in the design of the vehicle is limited. Also, when the acceleration sensor is mounted at a height different from the center of gravity, the acceleration detection of the acceleration sensor in the forward and backward directions is affected by the tangential acceleration due to the pitching of the vehicle, and noise is included in a detection value of the acceleration sensor.

CITATION LIST

[Patent Document]
[Patent Document 1]
Japanese Unexamined Patent Application, First Publication No. 2011-73633

SUMMARY OF INVENTION

Technical Problem

Therefore, an object of the present invention is to provide a saddle-type vehicle capable of increasing the degree of freedom in the design of the vehicle while suppressing a component of tangential acceleration due to pitching of a vehicle in forward and backward directions of a vehicle body from affecting acceleration detection in the forward and backward directions of the vehicle body due to an acceleration sensor.

Solution to Problem

A saddle-type vehicle according to the present invention includes an occupant protection device (21), a plurality of acceleration sensors (S1 and S2) which detect translational acceleration in forward and backward directions acting on a vehicle, and a control device (25) which controls an operation of the occupant protection device (21) on the basis of detection values of the acceleration sensors (S1 and S2), wherein the plurality of acceleration sensors (S1 and S2) include a first acceleration sensor (S1) and a second acceleration sensor (S2), the first acceleration sensor (S1) is disposed above a center of gravity (G) of the vehicle, the second acceleration sensor (S2) is disposed below the center of gravity (G), and the control device (25) averages a detection value (de1) detected by the first acceleration sensor (S1) and a detection value (de2) detected by the second acceleration sensor (S2) and controls an operation of the occupant protection device (21) on the basis of the averaged value.

With the above-described constitution, when pitching occurs in the vehicle at the time of a collision or the like, a component in the forward and backward directions of the vehicle body in tangential acceleration acting on the first acceleration sensor and a component in the forward and backward directions of the vehicle body in the tangential acceleration acting on the second acceleration sensor are opposite to each other. Accordingly, the component in the forward and backward directions of the vehicle body in tangential acceleration acting on the first acceleration sensor and the component in the forward and backward directions of the vehicle body in the tangential acceleration acting on the second acceleration sensor work in directions in which they offset each other. The detection value of the first acceleration sensor and the detection value of the second acceleration sensor are averaged and used for operation control including collision determination of the occupant protection device. Therefore, it is possible to stably control the operation of the occupant protection device in a state in which the component in the forward and backward directions of the vehicle body in the tangential acceleration acting on both acceleration sensors is offset. Thus, when a collision determination based on the average is performed, it is possible to mount the acceleration sensor at a height different from a position of the center of gravity of the vehicle. Accordingly, the degree of freedom of layout of the other parts around the first acceleration sensor and the second acceleration sensor is increased.

A separation distance (D1) from a horizontal line (H1) passing through the center of gravity (G) and extending in a vehicle width direction to the first acceleration sensor (S1) and a separation distance (D2) from the horizontal line (H1) to the second acceleration sensor (S2) may be set to the same distance.

In this case, since absolute values of the components in the forward and backward directions of the vehicle body in the tangential acceleration acting on the first acceleration sensor and the second acceleration sensor at the time of pitching of the vehicle become substantially equal, when the component in the forward and backward directions of the vehicle body in the tangential acceleration acting on the first acceleration sensor and the component in the forward and backward directions of the vehicle body in the tangential acceleration acting on the second acceleration sensor are averaged, they are almost offset.

The first acceleration sensor (S1) and the second acceleration sensor (S2) may be disposed on the same side of the center of gravity (G) in the forward and backward directions of the vehicle.

In this case, since the first acceleration sensor and the second acceleration sensor are disposed at a comparatively consolidated position, maintenance of both acceleration sensors, and the like can be easily performed.

The first acceleration sensor (S1) and the second acceleration sensor (S2) may be disposed at point symmetrical positions centered on the center of gravity (G) in a rear view of the vehicle.

In this case, it is possible to reduce an influence of deviation of the acceleration on the right side of the vehicle and the left side of the vehicle with the position of the center of gravity therebetween. Further, when the first acceleration sensor and the second acceleration sensor can also detect the acceleration in a width direction of the vehicle body, it is possible to offset a moment component due to rolling of the vehicle and use it for controlling the occupant protection device.

Advantageous Effects of Invention

According to the present invention, since the first acceleration sensor is disposed above the center of gravity of the vehicle and the second acceleration sensor is disposed below the center of gravity of the vehicle, and the control device averages the detection values detected by the first acceleration sensor and the second acceleration sensor and controls the operation of the occupant protection device on the basis of the averaged value, it is possible to dispose the first acceleration sensor and the second acceleration sensor at positions shifted from the position of the center of gravity of the vehicle while suppressing the component in the forward and backward directions of the vehicle body in the tangential acceleration due to the pitching of the vehicle from affecting the acceleration detection in the forward and backward directions of the vehicle body. Therefore, according to the present invention, the degree of freedom of designing the vehicle can also be increased.

DESCRIPTION OF EMBODIMENTS

Figure 1:
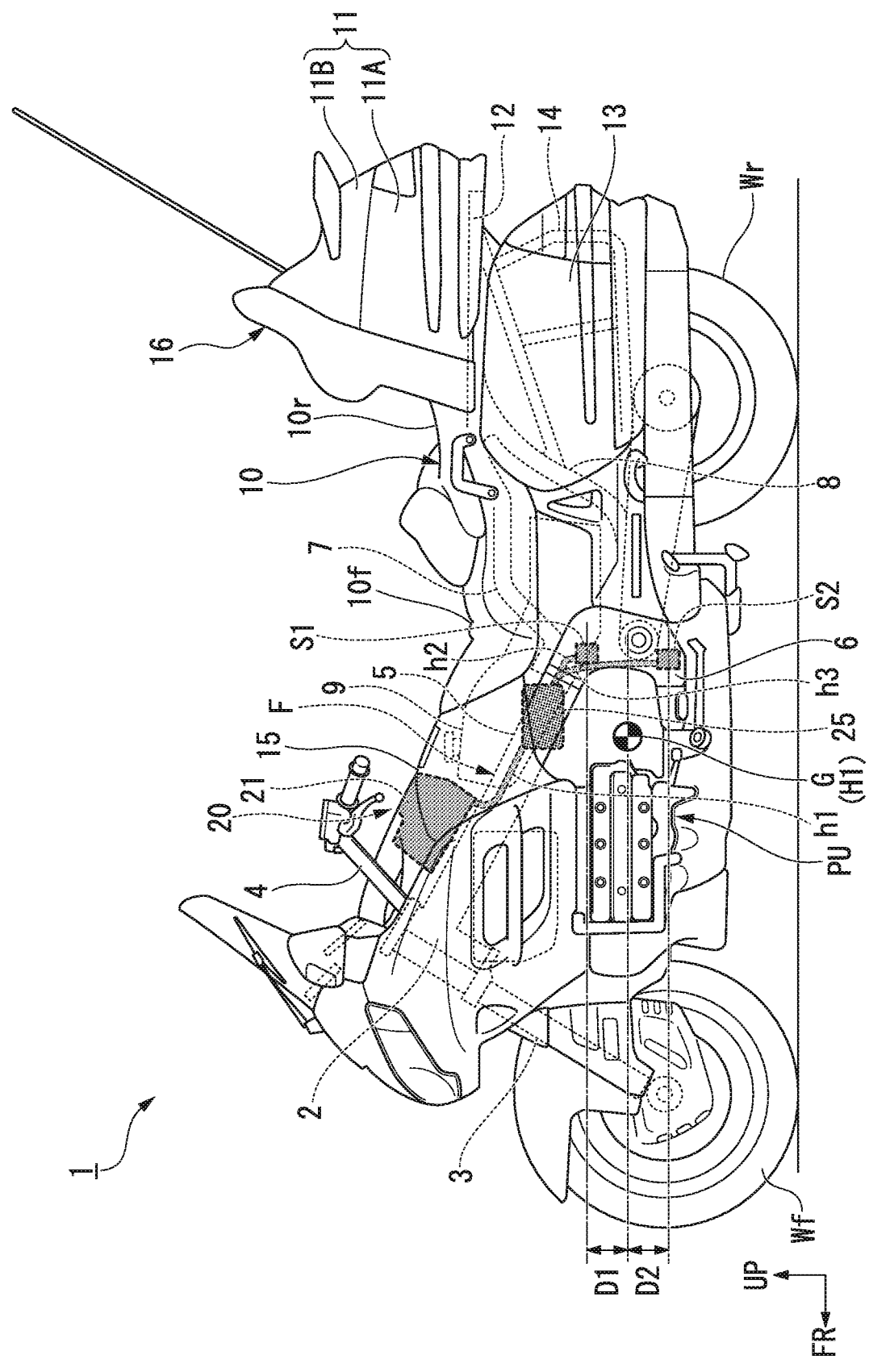
FIG. 1 is a side view of a saddle-type vehicle according to one embodiment of the present invention.

Hereinafter, an embodiment of the present invention will be described with reference to the drawings. In the following description, the directions such as forward, backward, left and right are the same as those in a vehicle described below unless otherwise noted. Also, in the drawings used for the following description, an arrow FR indicating a front of the vehicle, an arrow LH indicating a left side of the vehicle, and an arrow UP indicating an upper side of the vehicle are shown at appropriate positions.

Figure 2:
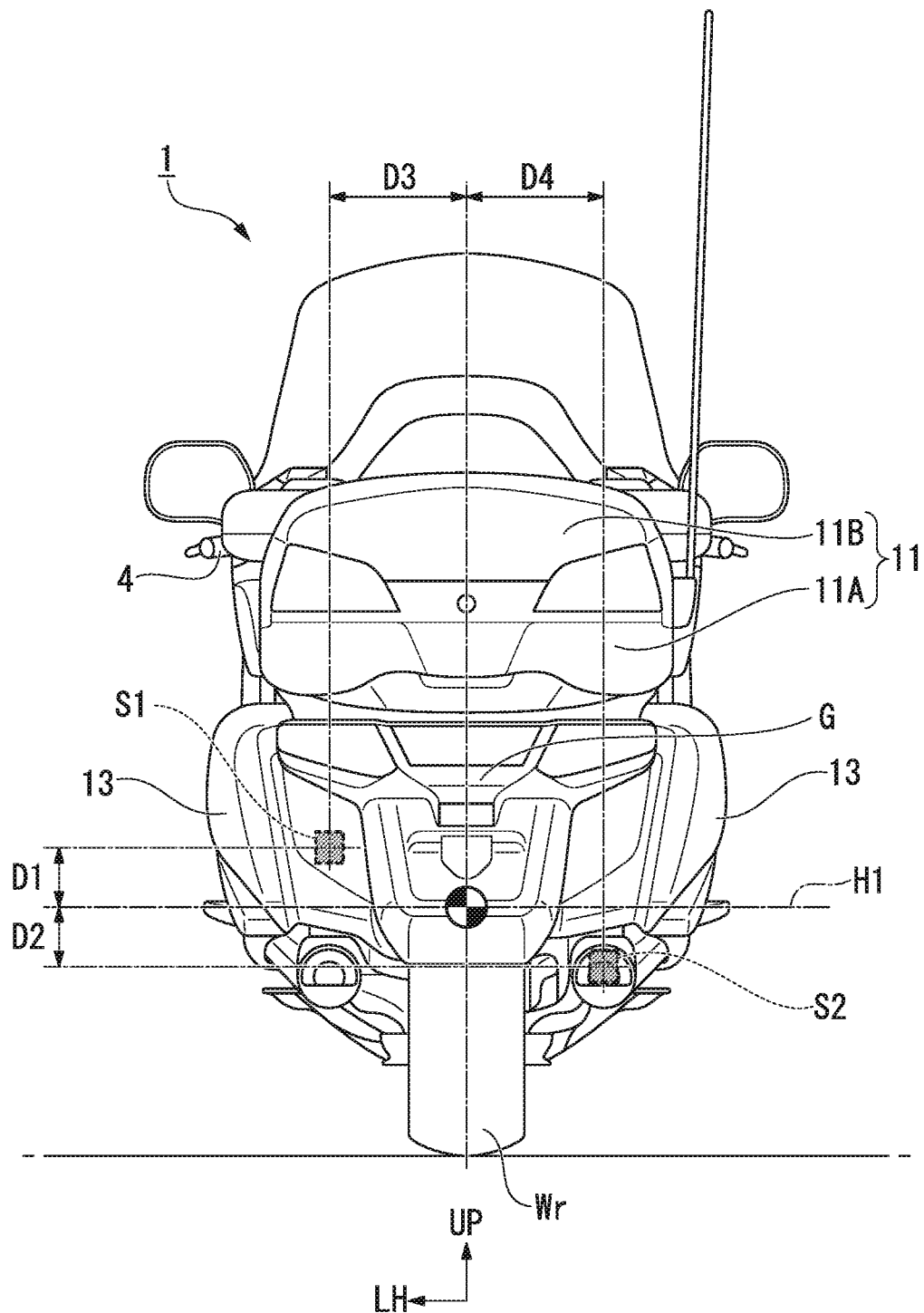
FIG. 2 is a rear view of the saddle-type vehicle according to one embodiment of the present invention.

FIG. 1 is a view of a motorcycle 1 as one form of a saddle-type vehicle when seen from the left side. FIG. 2 is a view of the motorcycle 1 when seen from the rear.

In the motorcycle 1, left and right front forks 3 are steerably held by a head pipe 2 at a front end of a body frame F via a steering stem (not shown). A front wheel Wf is rotatably supported at lower ends of the left and right front forks 3. A handle 4 for steering the front wheel is mounted on an upper portion of the steering stem.

A pair of left and right main frames 5 extend obliquely downward and rearward from the head pipe 2. Upper ends of pivot frames 6 are connected to rear portions of the left and right main frames 5. A power unit PU including an engine and a transmission is mounted below the left and right main frames 5 and in front of the right and left pivot frames 6.

A front end of a swing arm (not shown) is pivotally supported by the left and right pivot frames 6 to be vertically swingable. A rear wheel Wr is rotatably supported at a rear end of the swing arm. The rear wheel Wr receives power from the power unit PU via a power transmission mechanism.

A front end of a seat frame 7 extending toward the rear side of a vehicle body is coupled to the upper ends of the right and left pivot frames 6. Also, a support frame 8 extending to the rear side of the vehicle body and then extending rearward and obliquely upward is coupled to a substantially central position of each of the right and left pivot frames 6 in a vertical direction. Rear ends of the left and right support frames 8 are connected to rear portions of the right and left corresponding seat frames 7, respectively.

A fuel tank 9 is supported at a portion straddling the left and right main frames 5 and an upper portion of the pivot frame 6. Further, a tandem type seat 10 which allows a driver and an occupant to sit side by side in the forward and backward directions is supported on the right and left seat frames 7. An upper side and the left and right side portions of a front region of the fuel tank 9 are covered with a body cover 15 on a front portion side of the seat 10. In the seat 10, a front seating surface 10f on which the driver sits is disposed on a front portion side, and a rear seating surface 10r on which the passenger in a rear seat is seated is provided at a rear portion of the front seating surface 10f to rise stepwise.

Also, a trunk stay 12 which supports a trunk case 11 for storing articles and a saddle bag stay 14 which supports a saddle bag 13 for storing articles at lower left and right sides of the trunk case 11 are coupled in rear ends of the left and right seat frames 7 and rear inclined portions of the left and right support frames 8. The trunk case 11 includes a trunk main body 11A which opens to the upper side, and a trunk lid 11B which closes the upper opening of the trunk main body 11A to be opened and closed. Further, a backrest 16 which supports a back portion of an occupant sitting on the rear seating surface 10r of the seat 10 is disposed at a front portion of the trunk case 11.

Further, an airbag module 21 of an airbag device 20 which inflates and deploys a bag when an impact is input and protects an occupant is disposed inside the body cover 15. The airbag device 20 includes the airbag module 21 having an inflator and a bag which are not shown, a first acceleration sensor S1 and a second acceleration sensor S2 which detect translational acceleration in the forward and backward directions acting on the vehicle, and a control device 25 which controls an operation of the airbag module 21 on the basis on detection results of the first acceleration sensor S1 and the second acceleration sensor S2.

The control device 25 is supported by a stay (not shown) extending from the power unit PU at a position on a rear lower side of the airbag module 21. Also, the first acceleration sensor S1 and the second acceleration sensor S2 are disposed on a rear lower side further than the control device 25. Therefore, due to such a constitution, a wiring length of each of a harness h1 which connects the control device 25 with the airbag module 21, a harness h2 which connects the control device 25 with the first acceleration sensor S1, and a harness h3 which connects the control device 25 with the second acceleration sensor S2 is short.

The first acceleration sensor S1 is mounted at a position to the left of and behind the center of gravity G of the vehicle and above the center of gravity G On the other hand, the second acceleration sensor S2 is mounted at a position to the right of and behind the center of gravity G of the vehicle and below the center of gravity G Also, the first acceleration sensor S1 and the second acceleration sensor S2 are provided on the vehicle body so that a separation distance D1 from a horizontal line H1 passing through the center of gravity G of the vehicle and extending in a vehicle width direction to the first acceleration sensor S1 and a separation distance D2 from the horizontal line H1 to the second acceleration sensor S2 are the same distance.

Further, a position of the center of gravity G in the embodiment is a position of the center of gravity of the vehicle in a state in which there is no occupant on the vehicle. The position of the center of gravity G is set at a center in the vehicle width direction.

Further, as shown in FIG. 2, the first acceleration sensor S1 and the second acceleration sensor S2 are disposed at point symmetrical positions centered on the center of gravity G in a rear view of the vehicle. That is, the first acceleration sensor S1 and the second acceleration sensor S2 are set to both have the same distance with respect to a separation distance D3 from the center of gravity G to the first acceleration sensor S1 in the vehicle width direction and a separation distance D4 from the center of gravity G to the second acceleration sensor S2 in the vehicle width direction.

In the case of the embodiment, the control device 25 averages a detection value de1 detected by the first acceleration sensor S1 and a detection value de2 detected by the second acceleration sensor S2 and controls the operation of the airbag device 20 on the basis of the averaged value.

Figure 3:
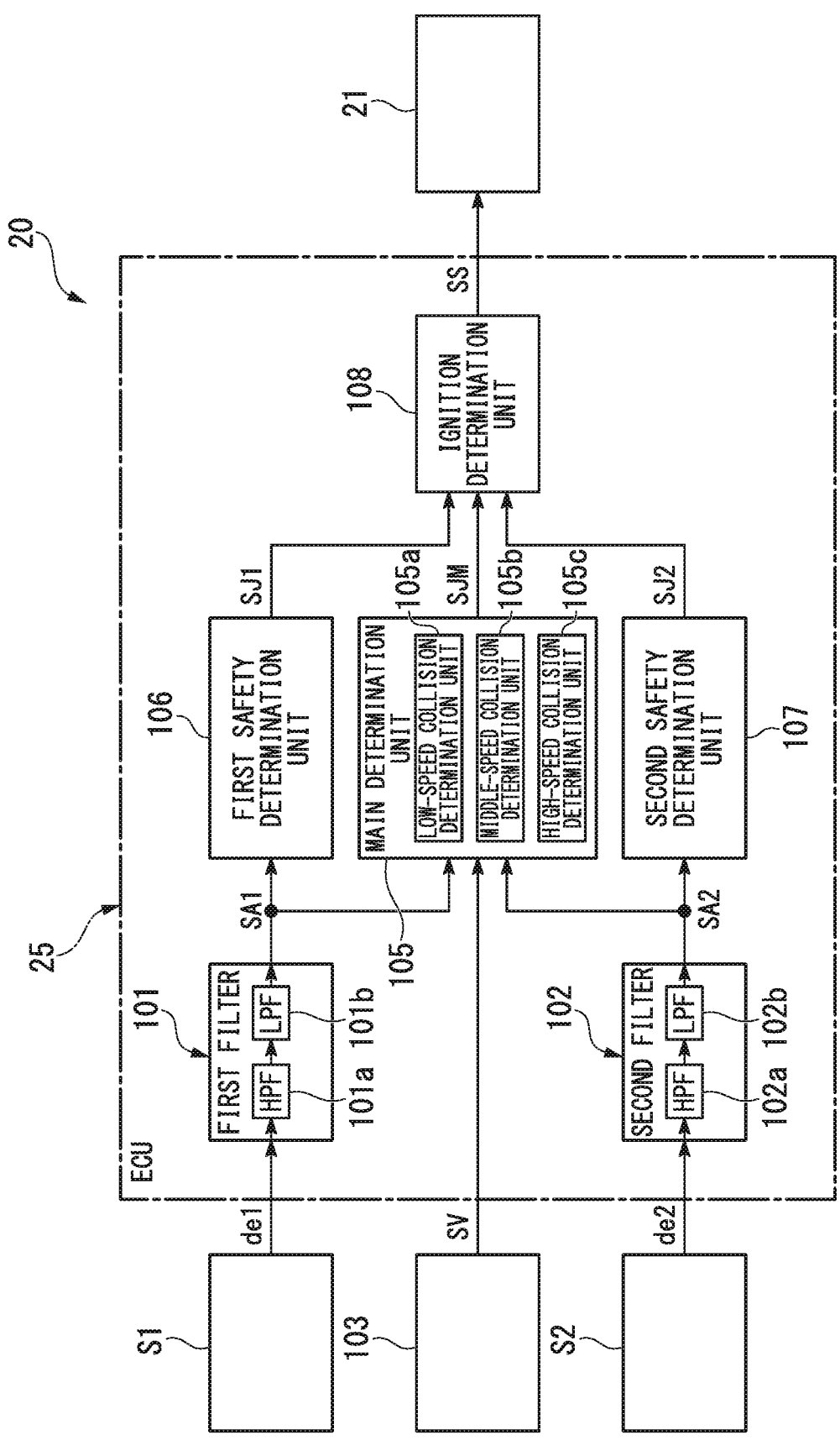
FIG. 3 is a block diagram showing a constitution of an airbag device according to one embodiment of the present invention.

FIG. 3 is a block diagram showing a schematic constitution of the airbag device 20 centered on the control device 25.

In addition to the first acceleration sensor S1 and the second acceleration sensor S2, a vehicle speed sensor 103 which detects a traveling speed of the vehicle is connected to an input side of the control device 25, and an inflator operating unit of the airbag module 21 is connected to an output side of the control device 25.

The control device 25 includes a digital first filter 101 to which the detection value de1 (acceleration signal) is input from the first acceleration sensor S1, a digital second filter 102 to which the detection value de2 (acceleration signal) is input from the second acceleration sensor S2, and a main determination unit 105 which determines whether or not the vehicle has collided on the basis of a first acceleration signal SA1 and a second acceleration signal SA2 obtained by respectively passing through the first filter 101 and the second filter 102 and a vehicle speed signal SV from the vehicle speed sensor 103.

The control device 25 further includes a first safety determination unit 106 which independently determines whether or not the vehicle collided on the basis of the first acceleration signal SA1, a second safety determination unit 107 which independently determines whether or not the vehicle collided on the basis of the second acceleration signal SA2, and an ignition determination unit 108 which determines whether to ignite the inflator in the airbag module 21 on the basis of determination signals SJM, SJ1 and SJ2 output from the main determination unit 105, the first safety determination unit 106 and the second safety determination unit 107. The ignition determination unit 108 outputs an operation command SS to the airbag module 21 when it is determined that the inflator is to be ignited.

The first filter 101 and the second filter 102 include high-pass filters 101a and 102a which remove drift components included in the detection values de1 and de2, and low-pass filters 101b and 102b which remove high-frequency components unnecessary for collision determination. The vehicle speed sensor 103 calculates the vehicle speed using, for example, a detection signal of a wheel speed sensor (not shown) which detects rotational speeds of the front wheel Wf and the rear wheel Wr.

The main determination unit 105 is a block which determines collision of the vehicle on the basis of the vehicle speed signal SV and the average value of the first acceleration signal SA1 and the second acceleration signal SA2 and outputs a signal corresponding to a determination result, and includes a low-speed collision determination unit 105a, a medium-speed collision determination unit 105b, a high-speed collision determination unit 105c, a threshold calculation unit (not shown), and a main OR circuit (not shown). When any one of the low-speed collision determination unit 105a, the medium-speed collision determination unit 105b and the high-speed collision determination unit 105c determines collision, the main determination unit 105 outputs the determination signal SJM from the main OR circuit to the ignition determination unit 108.

The low-speed collision determination unit 105a is a block which determines whether or not the vehicle has collided in a low speed state on the basis of the average value of the first acceleration signal SA1 and the second acceleration signal SA2. The low-speed collision determination unit 105a always cumulatively integrates the average value of the first acceleration signal SA1 and the second acceleration signal SA2 and determines that the collision has occurred when the value exceeds a preset reference accumulation value.

In such a low-speed collision determination, when the average value of the first acceleration signal SA1 and the second acceleration signal SA2 are simply cumulatively integrated, an acceleration/deceleration signal other than the collision at the time of sudden acceleration or sudden deceleration is also accumulated. Therefore, in the low-speed collision determination unit 105a, the acceleration detected at the time of sudden acceleration or sudden deceleration other than the collision is subtracted from the acceleration/deceleration signal, and then the value is cumulatively integrated.

The medium-speed collision determination unit 105b is a block which determines whether or not the vehicle has collided in a medium speed state on the basis of the average value of the first acceleration signal SA1 and the second acceleration signal SA2. The medium-speed collision determination unit 105b always integrates the average value of the first acceleration signal SA1 and the second acceleration signal SA2 with a predetermined time width and determines that the collision has occurred when the value exceeds a preset value.

The high-speed collision determination unit 105c is a block which determines whether or not the vehicle has collided in a high speed state on the basis of the average value of the first acceleration signal SA1 and the second acceleration signal SA2. The high-speed collision determination unit 105c obtains an average value of the average value of the first acceleration signal SA1 and the second acceleration signal SA2 during a predetermined time width and determines that the collision has occurred when a change amount of the obtained average value during a certain period of time exceeds a preset value.

Also, the first safety determination unit 106 and the second safety determination unit 107 are blocks which verify the collision determination in the main determination unit 105 using the first acceleration signal SA1 and the second acceleration signal SA 2 independently and suppress malfunction of the airbag module 21 when either the first acceleration sensor S1 or the second acceleration sensor S2 malfunctions and the main determination unit 105 outputs a signal indicating occurrence of the collision.

Here, the arrangement of the first acceleration sensor S1 and the second acceleration sensor S2 will be described in detail.

Figure 4:
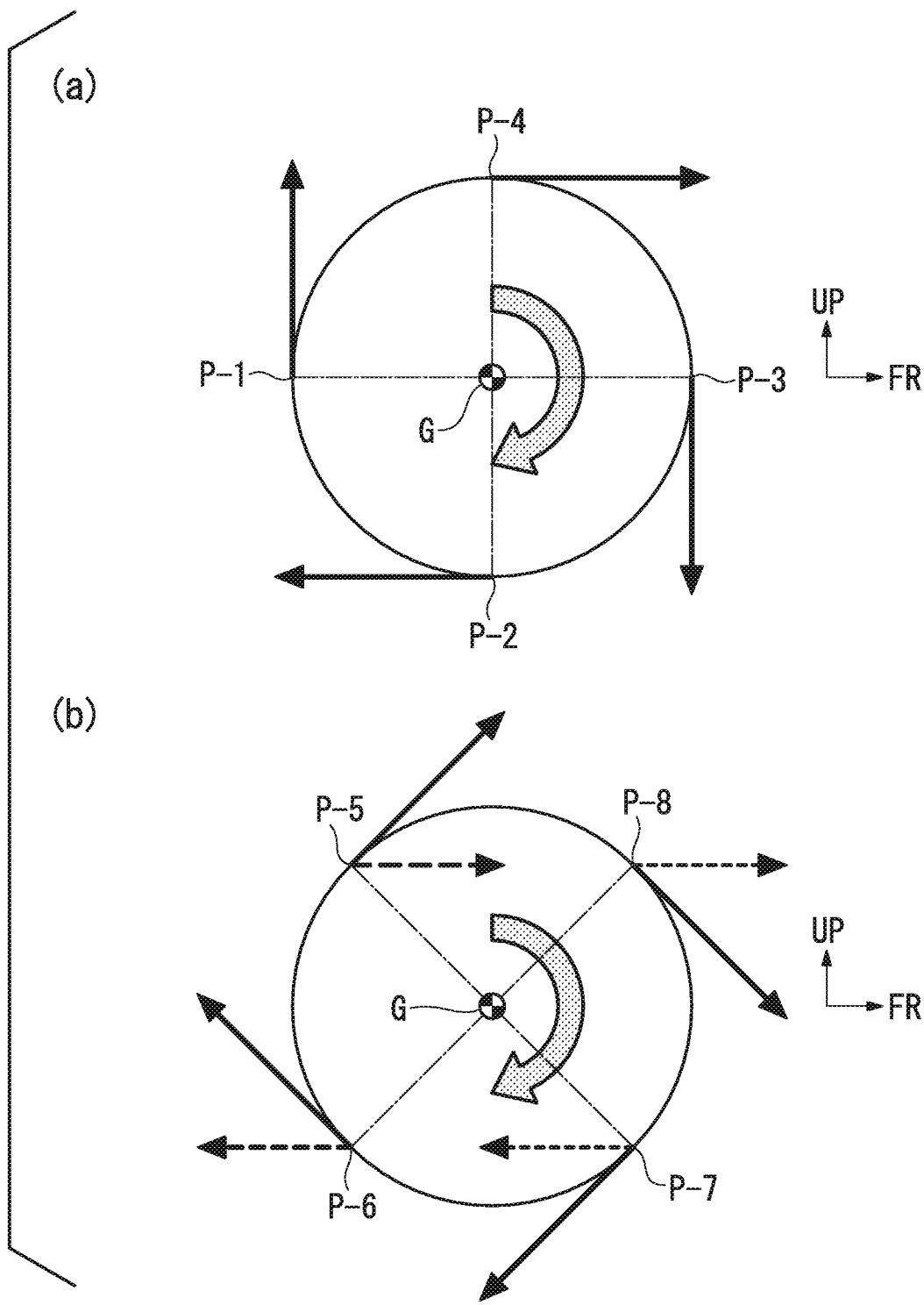
FIG. 4 is a schematic view for explaining effective mounting positions of a first acceleration sensor and a second acceleration sensor of the saddle-type vehicle.

FIG. 4 is a schematic side view around the center of gravity G of the vehicle, and is a view for explaining effective mounting positions of the first acceleration sensor S1 and the second acceleration sensor S2.

The above-described arrangement of the first acceleration sensor S1 and the second acceleration sensor S2 is set to a position corresponding to p-5 and a position corresponding to p-6 in FIG. 4(b).

Figure 5:
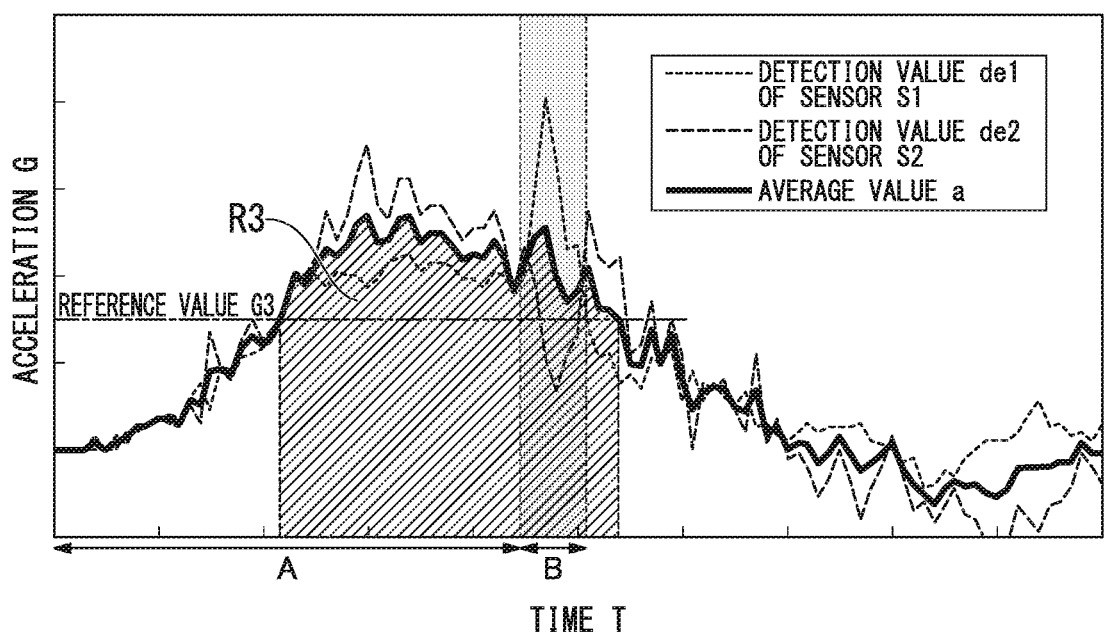
FIG. 5 is a graph showing a change in detection values of the first acceleration sensor and the second acceleration sensor and a change in an average value used in a control device according to one embodiment of the present invention.

FIG. 5 is a graph showing the changes of the detection values de1 and de2 of the first acceleration sensor S1 and the second acceleration sensor S2 and the change of the average value a used in the control device 25 at the time of a forward collision of the vehicle.

When the front wheel Wf collides with another object during traveling of the motorcycle 1, negative translational acceleration is generated in the forward direction at an initial stage of the collision, and a front wheel suspension (the front fork 3) sinks. When the front wheel suspension sinks to the vicinity of a limit position, large pitching around the center of gravity G of the vehicle occurs in the vehicle. A region A in FIG. 5 is a sinking region of the front wheel suspension at the initial stage of the collision or the like, and a region B in FIG. 5 is a region in which the front wheel touches the bottom. As shown in the same drawing, variations of the detection values de1 and de2 of the first acceleration sensor S1 and the second acceleration sensor S2 are relatively small in the region A, but in the region B in which the component in the forward and backward direction of the vehicle body in tangential acceleration due to the pitching which is increased due to the front wheel suspension touching the bottom is input to each of the acceleration sensor S1 and S2, the variations of the detection values de1 and de2 of the first acceleration sensor S1 and the second acceleration sensor S2 are increased.

In the case of the embodiment, the control device 25 averages the detection values de1 and de2 of the first acceleration sensor S1 and the second acceleration sensor S2 after removing the noise due to the first and second filters 101 and 102, and offsets the variations in the detection values de1 and de2. The control device 25 controls a deployment operation of the airbag module 21 of the airbag device 20 using this average value a. Therefore, in the above-described low-speed collision determination, it is possible to set a reference value G3 of the acceleration allowing the cumulative integration to be small (refer to FIG. 9), capered with a case in which one of heights of the first acceleration sensor S1 and the second acceleration sensor S2 is detected (refer to FIGS. 7 and 8). Therefore, since a period of the collision determination can be made longer, the collision of the vehicle can be determined quickly and accurately, and the airbag device 20 can be deployed accurately.

Figure 6:
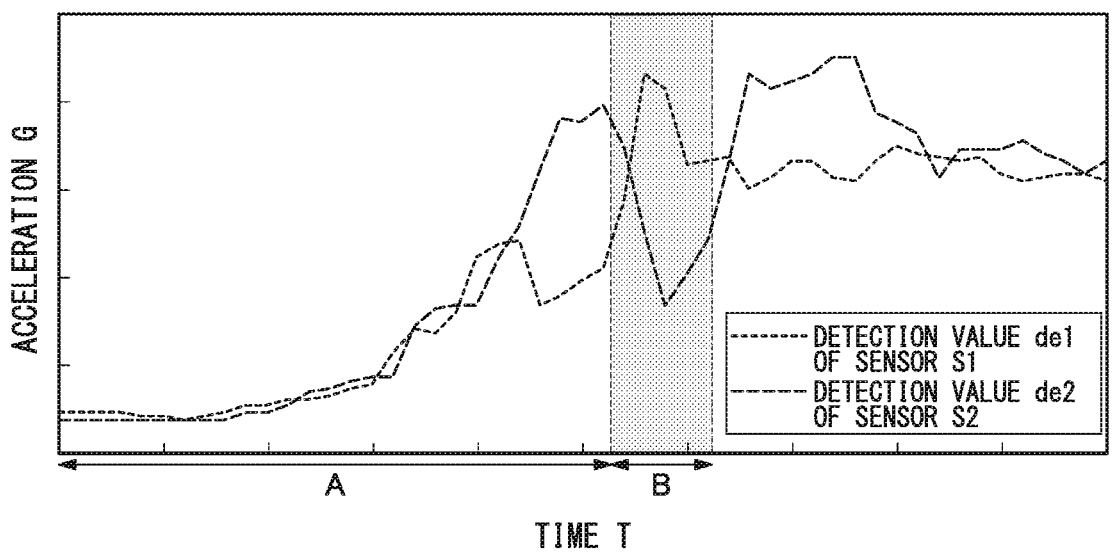
FIG. 6 is a graph showing the change in the detection values of the first acceleration sensor and the second acceleration sensor according to one embodiment of the present invention.

FIG. 6 is a graph showing the changes of the detection values de1 and de2 of the first acceleration sensor S1 and the second acceleration sensor S2 during traveling of the vehicle in a simplified manner.

Figure 7:
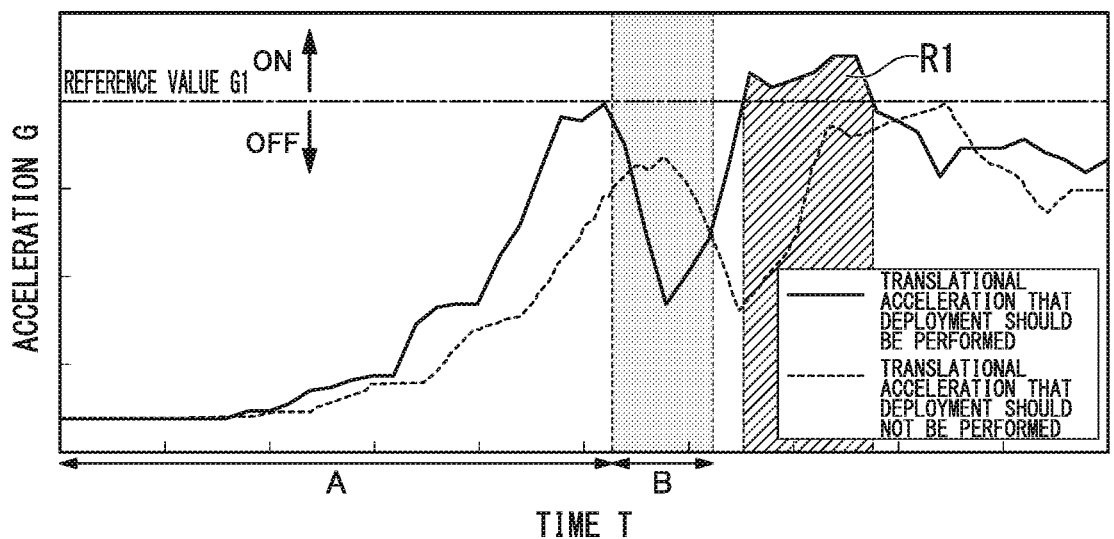
FIG. 7 is a graph for explaining collision detection of a comparative example using only the second acceleration sensor.

On the other hand, FIG. 7 is a graph showing a state of the change of the detection value de2 of the second acceleration sensor S2 (the acceleration sensor disposed on the lower side further than the center of gravity G) in a situation in which the translational acceleration that the airbag module 21 should be deployed is generated and a state of the change of the detection value de2 of the second acceleration sensor S2 in a situation in which the translational acceleration that the airbag module 21 should not be deployed is generated in a simplified manner.

In the low-speed collision determination, the reference value which allows the cumulative integration for determining the collision is set on the basis of the translational acceleration that the airbag module 21 should not be deployed. Therefore, when the collision is determined using only the detection value de2 of the second acceleration sensor S2 disposed further below the center of gravity G, in the region B, it is affected greatly by the component in the forward and backward direction of the vehicle body in the tangential acceleration due to the pitching, and the noise of the detection value de2 increases, as shown in FIG. 7. Therefore, it is necessary to set a reference value G shown in FIG. 7 to be large. However, when the reference value G1 is set to be large, a section R1 in which the collision can be determined is shortened, as shown in FIG. 7.

Figure 8:
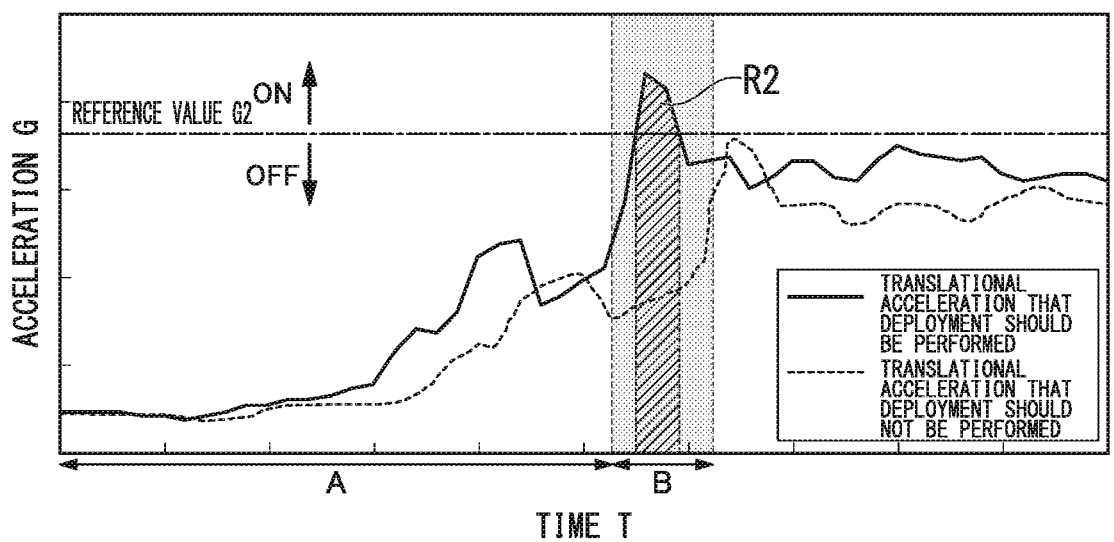
FIG. 8 is a graph for explaining the collision detection of a comparative example using only the first acceleration sensor.

FIG. 8 is a graph showing a state of the change of the detection value de1 of the first acceleration sensor S1 (the acceleration sensor disposed further above the center of gravity G) in the situation in which the translational acceleration that the airbag module 21 should be deployed is generated and a state of the change of the detection value de1 of the first acceleration sensor S1 in the situation in which the translational acceleration that the airbag module 21 should not be deployed is generated in a simplified manner.

When the collision is determined using only the detection value de1 of the first acceleration sensor S1 disposed on the upper side further than the center of gravity G, in the region B, it is affected instantaneously greatly by the component in the forward and backward direction of the vehicle body in the tangential acceleration due to the pitching, and the noise of the detection value de1 increases, as shown in FIG. 8. Therefore, in the low-speed collision determination, it is necessary to set a reference value G2 shown in FIG. 8 to be large. However, when the reference value G2 is set to be large, a section R2 in which the collision can be determined is shortened, as shown in FIG. 8.

Figure 9:
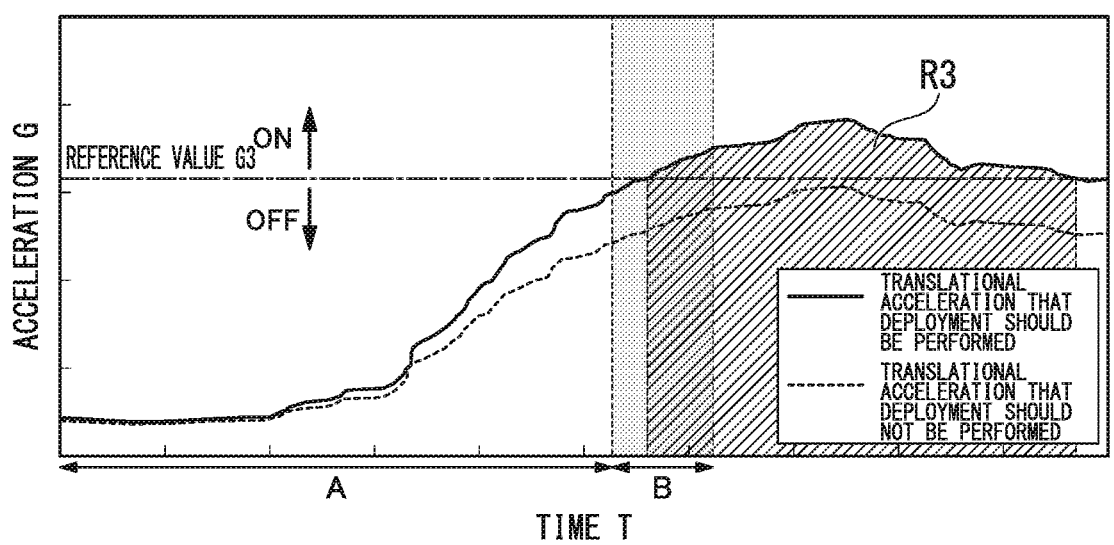
FIG. 9 is a graph for explaining the collision detection according to one embodiment of the present invention using the first acceleration sensor and the second acceleration sensor.

FIG. 9 is a graph showing a state of the change of the average value a of the detection values de1 and de2 of the first acceleration sensor S1 and the second acceleration sensor S2 in the situation in which the translational acceleration that the airbag device 20 should be operated is generated and a state of the change of the average value a of the detection values de1 and de2 of the first acceleration sensor S1 and the second acceleration sensor S2 in the situation in which the translational acceleration that the airbag device 20 should not be operated is generated in a simplified manner.

In the embodiment using the average value a of the detection values de1 and de2 of the first acceleration sensor S1 and the second acceleration sensor S2, as shown in FIG. 9, also in the region B, there is no large fluctuation in an output due to the component in the forward and backward direction of the vehicle body in the tangential acceleration caused by the pitching. Therefore, a reference value G3 shown in FIG. 9 can be set to be smaller than the reference values G1 and G2 shown in FIGS. 7 and 8. Therefore, in the low-speed collision determination, as shown in FIG. 9, it is possible to start the collision determination earlier and to lengthen a section R3 in which the collision can be determined. Therefore, it is possible to quickly and accurately determine the low-speed collision of the vehicle and to accurately deploy the airbag module 21.

Here, although the low-speed collision determination of the control device 25 has been described in detail, in the case of the embodiment, since the average value a of the detection values de1 and de2 of the first acceleration sensor S1 and the second acceleration sensor S2 is also used in the medium-speed collision determination and the high-speed collision determination, it is possible to reduce the noise of the input signal at the time of occurrence of the pitching. Therefore, it is possible to quickly and accurately determine the medium-speed collision or the high-speed collision of the vehicle and to accurately deploy the airbag module 21.

In the embodiment, the control device 25 performs the collision determination of the vehicle by the following three methods (a), (b) and (c).

(a) The average value of the first acceleration signal SA1 and the second acceleration signal SA2 exceeding the reference value is cumulatively integrated, and it is determined that the collision occurs when the value exceeds a reference cumulative value.

(b) The average value of the first acceleration signal SA1 and the second acceleration signal SA2 is always integrated with a certain time width and it is determined that the collision occurs when the value exceeds a preset value.

(c) An average value of the average value of the first acceleration signal SA1 and the second acceleration signal SA2 during a predetermined time width is obtained, and it is determined that the collision occurs when a change amount of the obtained average value for a certain time exceeds a set value.

The collision determination method using the control device 25 is not limited to (a), (b) and (c), and for example, in each of (b) and (c), each of the set values for determining the collision may be changed to different values according to calculated values of the detection acceleration.

Also, in the embodiment, when results of the three collision determinations including the collision determination due to the first acceleration signal SA 1, the collision determination due to the second acceleration signal SA2 and the collision determination due to the average value of the first acceleration signal SA1 and the second acceleration signal SA2 are completed (when it is determined at all the cases that the collision occurs), the operation command SS is output to the airbag module 21. That is, when either the first acceleration sensor SA1 or the second acceleration sensor S2 breaks down, the operation command SS is not output to the airbag module 21. When either the first acceleration sensor SA1 or the second acceleration sensor S2 breaks down, a lamp which informs the breakdown to an indicator of a meter panel (not shown) of a driver's seat is turned on, and thereafter the performance of the collision determination is stopped.

As described above, in the motorcycle 1 according to the embodiment, the first acceleration sensor S1 is disposed on the upper side of the center of gravity G of the vehicle, the second acceleration sensor S2 is disposed on the lower side of the center of gravity G of the vehicle, and the control device 25 averages the detection values de1 and de2 detected by the first acceleration sensor S1 and the second acceleration sensor S2 and controls the operation of the airbag module 21 on the basis of the averaged value. Thus, it is possible to dispose the first acceleration sensor S1 and the second acceleration sensor S2 to be shifted upward and downward from the position of the center of gravity G of the vehicle while suppressing the component in the forward and backward direction of the vehicle body in the tangential acceleration due to the pitching of the vehicle from affecting the acceleration detection in the forward and backward direction of the vehicle body. Therefore, in the motorcycle 1 according to the embodiment, the degree of freedom of the mounting of the first acceleration sensor S1 and the second acceleration sensor S2 is increased, and as a result, the degree of freedom of the design of surrounding members can be increased.

Also, in the motorcycle 1 according to the embodiment, the separation distance D1 from the horizontal line H1 passing through the center of gravity G and extending in the vehicle width direction to the first acceleration sensor S1 and the separation distance D2 from the horizontal line H1 to the second acceleration sensor S2 are set to the same distance. Therefore, at the time of pitching of the vehicle, an absolute value of the component in the forward and backward direction of the vehicle body in the tangential acceleration acting on the first acceleration sensor S1 and an absolute value of the component in the forward and backward direction of the vehicle body in the tangential acceleration acting on the second acceleration sensor S2 are equal to each other, and both moment components are almost offset each other. Accordingly, in the motorcycle 1 according to the embodiment, the acceleration detection in the forward and backward direction of the vehicle body is less likely to be affected by the component in the forward and backward direction of the vehicle body in the tangential acceleration due to the pitching of the vehicle, and it is possible to operate the airbag module 21 at a more appropriate timing.

Also, in the case of the motorcycle 1 according to the embodiment, since both the first acceleration sensor S1 and the second acceleration sensor S2 are disposed on the same side with respect to the center of gravity G in the forward and backward direction of the vehicle body, it is possible to dispose the first acceleration sensor S1 and the second acceleration sensor S2 at relatively consolidated positions. Therefore, maintenance of the first acceleration sensor S1 and the second acceleration sensor S2 can be easily performed.

Also, in the motorcycle 1 according to the embodiment, the first acceleration sensor S1 and the second acceleration sensor S2 are disposed at point symmetrical positions centered on the center of gravity G in a rear view of the vehicle. Therefore, it is possible to measure the acceleration at the center of gravity G which is a midpoint between the first acceleration sensor S1 and the second acceleration sensor S2 by averaging the detection values of the first acceleration sensor S1 and the second acceleration sensor S2. Therefore, it is possible to operate the airbag module 21 with high accuracy.

Further, when the first acceleration sensor S1 and the second acceleration sensor S2 are capable of detecting the tangential acceleration due to rolling of the vehicle body, it is also possible to offset the component in the vehicle width direction in the tangential acceleration due to the rolling of the vehicle and to use it for deployment control of the airbag module 21.

In the above description, the example in which the first acceleration sensor S1 and the second acceleration sensor S2 are disposed in the portions corresponding to p-5 and p-6 in FIG. 4(*b*) has been described, but even when the first acceleration sensor S1 and the second acceleration sensor S2 are disposed in any of the following combination positions, the same basic effects can be obtained.

(1) p-4 and p-2 of FIGS. 4(*a*)
(2) p-8 and p-7 of FIGS. 4(*b*)
(3) p-5 and p-7 of FIGS. 4(*b*)
(4) p-8 and p-6 of FIGS. 4(*b*)
(5) p-1 and p-3 of FIG. 4(*b*)

It should be noted that the present invention is not limited to the above-described embodiment, and various design changes are possible without departing from the gist thereof. For example, in the above-described embodiment, one first acceleration sensor and one second acceleration sensor are provided, but a plurality of first acceleration sensors and a plurality of second acceleration sensors may be provided. Further, the occupant protection device is not limited to an airbag module of an airbag device and may be another device as long as it can protect the occupant at the time of inputting an impact.

Further, the saddle-type vehicle according to the present invention is not limited to a motorcycle (including a bicycle with a prime mover and a scooter type vehicle), and also includes a tricycle, a four-wheeled vehicle and so on.

REFERENCE SIGNS LIST

1 Motorcycle (saddle-type vehicle)
21 Airbag module (occupant protection device)
25 Control device
D1 Separation distance to first acceleration sensor
D2 Separation distance to second acceleration sensor
de1 Detection value of first acceleration sensor
de2 Detection value of second acceleration sensor
G Center of gravity
H1 Horizontal line
S1 First acceleration sensor
S2 Second acceleration sensor

What is claim is:

1. A saddle-type vehicle comprising:
an occupant protection device;
a plurality of acceleration sensors which detect translational acceleration in forward and backward directions acting on a vehicle; and
a control device which controls an operation of the occupant protection device on the basis of detection values of the acceleration sensors,
wherein the plurality of acceleration sensors include a first acceleration sensor and a second acceleration sensor,
the first acceleration sensor is disposed above a center of gravity of the vehicle,
the second acceleration sensor is disposed below the center of gravity, and
the control device averages a detection value detected by the first acceleration sensor and a detection value detected by the second acceleration sensor and controls an operation of the occupant protection device on the basis of the averaged value.

2. The saddle-type vehicle according to claim 1, wherein a separation distance from a horizontal line passing through the center of gravity and extending in a vehicle width direction to the first acceleration sensor and a separation distance from the horizontal line to the second acceleration sensor are set to the same distance.

3. The saddle-type vehicle according to claim 2, wherein the first acceleration sensor and the second acceleration sensor are disposed on the same side of the center of gravity in the forward and backward directions of the vehicle.

4. The saddle-type vehicle according to claim 2, wherein the first acceleration sensor and the second acceleration sensor are disposed at point symmetrical positions centered on the center of gravity in a rear view of the vehicle.

5. The saddle-type vehicle according to claim 1, wherein the first acceleration sensor and the second acceleration sensor are disposed on the same side of the center of gravity in the forward and backward directions of the vehicle.

6. The saddle-type vehicle according to claim 5, wherein the first acceleration sensor and the second acceleration sensor are disposed at point symmetrical positions centered on the center of gravity in a rear view of the vehicle.

7. The saddle-type vehicle according to claim 1, wherein the first acceleration sensor and the second acceleration sensor are disposed at point symmetrical positions centered on the center of gravity in a rear view of the vehicle.

* * * * *